US005898241A

United States Patent [19]

Ganderillas

[11] Patent Number: 5,898,241

[45] Date of Patent: Apr. 27, 1999

[54] READ HEAD FOR WIEGAND TOKEN

[75] Inventor: Carl Ganderillas, Beacon Falls, Conn.

[73] Assignee: HID Corporation, Irvine, Calif.

[21] Appl. No.: 09/015,873

[22] Filed: Jan. 29, 1998

Related U.S. Application Data

[63] Continuation-in-part of application No. 08/985,598, Dec. 5, 1997.

[51] Int. Cl.$^{6}$ ..................................................... G05B 5/187

[52] U.S. Cl. .......................... 307/419; 360/110; 360/113; 360/125; 29/603.01

[58] Field of Search ............................ 307/419; 360/110, 360/113, 125, 126; 29/603.01

[56] References Cited

U.S. PATENT DOCUMENTS

| | | | |
|---|---|---|---|
| 3,820,090 | 6/1974 | Wiegand . | |
| 4,008,458 | 2/1977 | Wensley . | |
| 4,047,236 | 9/1977 | Lee | 360/113 |
| 4,097,910 | 6/1978 | Lefevers et al. | 360/126 |
| 4,185,730 | 1/1980 | Roes et al. . | |
| 4,247,601 | 1/1981 | Wiegand . | |
| 4,263,523 | 4/1981 | Wiegand . | |
| 4,484,090 | 11/1984 | Wiegand et al. . | |
| 4,553,657 | 11/1985 | Kilmartin et al. . | |
| 4,593,209 | 6/1986 | Sloan . | |
| 4,652,957 | 3/1987 | Schewe et al. | 360/125 |
| 4,736,122 | 4/1988 | Opie et al. . | |
| 4,743,780 | 5/1988 | Opie . | |
| 4,758,742 | 7/1988 | Opie . | |
| 5,216,234 | 6/1993 | Bell . | |
| 5,461,526 | 10/1995 | Hamakawa et al. | 360/113 |

OTHER PUBLICATIONS

Sensor Engineering Co. (an Echlin Co.) 1990 "Zero Power Wiegand Sensor" 2 pgs.

*Primary Examiner*—Albert W. Paladini

*Attorney, Agent, or Firm*—McAulay Nissen Goldberg Kiel & Hand, LLP

[57] ABSTRACT

A read head for a Wiegand wire has two C-shaped ferromagnetic yokes in lateral alignment with one another, two magnets sandwiched between respective first and second legs-of the yokes, and a pickup coil wound on one of the legs of the read head. One magnet has a first polarity adjacent to the first leg of the first yoke, the other magnet has the first polarity adjacent to the second leg of the second yoke, and the reluctances of the two yokes are equal. When used in combination with a processor that processes the output pulses, a Wiegand token having one or more Wiegand wires therein may be detected by counting the number of output pulses of the read head and ascertaining the duration of time between occurrences of those pulses. Wiegand tokens having different values may have different numbers of Wiegand wires therein and/or different spacings between the Wiegand wires within the Wiegand token and, thus, the read head in combination with a processor can identify Wiegand tokens of different values.

18 Claims, 4 Drawing Sheets

FIG.2A
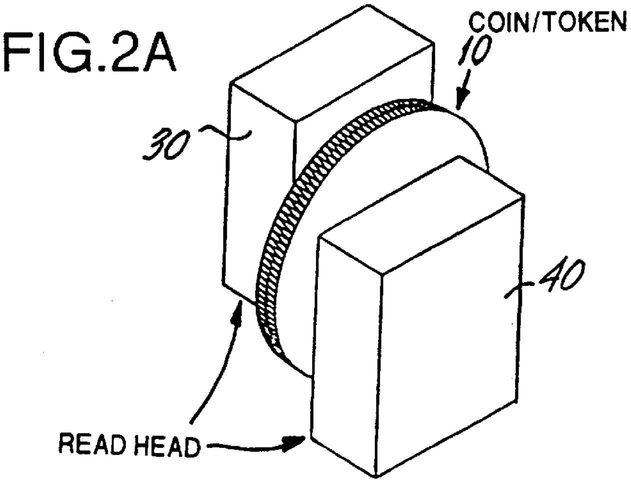
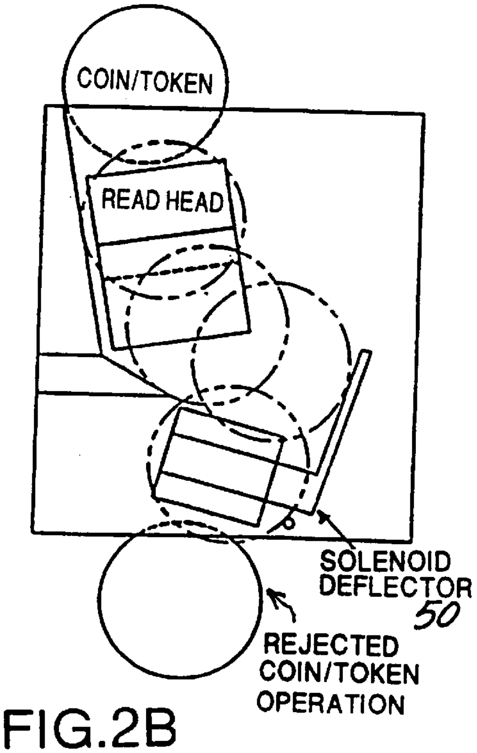
FIG.2B
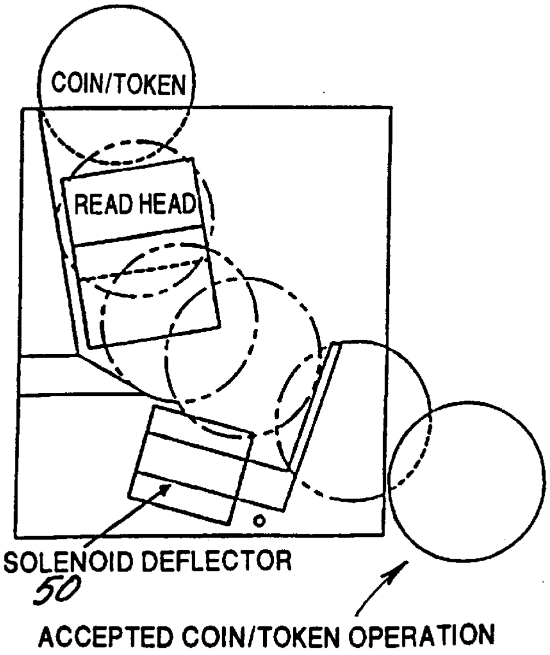
FIG.2C

READ HEAD FOR WIEGAND TOKEN

Related application: this is a continuation-in-part of application Ser. No. 08/985,598, filed Dec. 5, 1997.

BACKGROUND OF THE INVENTION

This invention relates to a read head for reading a token or coin having a Wiegand wire therein, and is particularly directed to a read head for use in, for example, coin-operated machines, such as gambling machines, and which is capable of detecting the insertion of such coins/tokens by providing an electrical pulse in response to a switch in state of the Wiegand wire in the inserted token.

The Wiegand wire is a ferro magnetic wire having core and shell portions with divergent magnetic properties. The currently preferred type of Wiegand wire is disclosed in U.S. Pat. No. 4,247,601, issued on Jan. 27, 1981, and which is incorporated herein by reference. Read heads which are effective to provide an output pulse from a switch in state of the Wiegand wire are described in U.S. Pat. No. 4,263,523, issued Apr. 21, 1981, and U.S. Pat. 4,593,209, issued Jun. 3, 1986. A module employing the Wiegand wire that is effective to generate a pulse in response to a change in magnetic field is described in U.S. Pat. No. 4,484,090, issued Nov. 20, 1984.

Read heads for use with a Wiegand wire are currently employed in various access systems. Codes are incorporated in access cards and keys where the Wiegand wire is employed in the card or key to provide the encoding. One technique of positioning these wires in the access card and for reading the wires as the wires are passed over the face of a read head is described in said U.S. Pat. No. 4,593,209. The manner in which the Wiegand wires are encoded on a code strip carried in an access card is described in connection with the discussion of FIGS. 5 and 6 in said U.S. Pat. No. 4,593,209. As shown therein, the "zero" bit wires are all parallel to one another in a single column like the rungs of a ladder. The "one" bit wires are also parallel to one another in a single column. However, the center lines of the two columns are spaced from one another. Thus, the zero bits are read by one portion of the read head and the one bits are read by another portion of the read head. U.S. Pat. No. 4,736,122 discloses an improved read head of those devices discussed in the patents mentioned above. As shown in FIG. 1 of U.S. Pat. No. 4,736,122, the read head described therein is E-shaped with a polarized magnet at each of the three legs and the magnets are sandwiched between a thin yoke and a thick yoke. The thin and thick yokes forming set and reset fields, respectively.

The read head designs previously known have maximum air gap ranges that limit their usefulness to only select applications. For example, the above-mentioned access card having Wiegand wires therein can be read by previous read heads due to the relatively short distance between the Wiegand wires themselves and the face of the read head. Further, such read heads are inappropriate for reading Wiegand wires that do not by themselves represent either a zero bit or a one bit, such as Wiegand wires that are embedded within a novel coin or token.

It is therefore an object of this invention to provide a read head that has a greater air gap range than that of previous devices.

It is another object of this invention to provide a read head that is capable of reading a novel coin or token having one or more Wiegand wires therein.

Various other objects, advantages and features of the present invention will become readily apparent to those of ordinary skill in the art, and the novel features will be particularly pointed out in the appended claims.

SUMMARY OF THE INVENTION

In accordance with an embodiment of the present invention, a read head is provided to be used with a Wiegand wire wherein the read head responds to a field change generated from a switch in state of the Wiegand wire to provide an output pulse. The read head includes two C-shaped ferro-magnetic yokes in lateral alignment with one another, two magnets sandwiched between respective first and second legs of the yokes, and a pickup coil wound on one of the legs of the read head. One magnet has a first polarity adjacent to the first leg of the first yoke, the other magnet has the first polarity adjacent to the second leg of the second yoke, and the reluctances of the two yokes are equal.

As an aspect of the present invention, the field that is produced adjacent the ends of the two legs of the first yoke is substantially equal in amplitude and opposite in direction from the field that is produced adjacent the ends of the two legs of the second yoke.

As another aspect of the present invention, the Wiegand token that is read includes therein a Wiegand wire that is circular in shape so that the read head responds separately to each magnetic field change generated from a switch in state of each of two wire segments of the Wiegand wire in the token as the respective wire segment passes by the read head.

As a further aspect of the present invention, the read head separately detects each of a plurality of Wiegand wires that are included within the Wiegand token.

In accordance with another embodiment of the present invention, an apparatus for detecting a Wiegand token includes the above-mentioned read head and a processor that processes the pulses output from the read head to identify whether or not the read head responded to a Wiegand token.

As an aspect of this embodiment, the processor ascertains the number of output pulses as well as the duration of time between occurrences of those pulses, and identifies the Wiegand token from the ascertained information.

In accordance with a further embodiment of the present invention, a method of detecting a Wiegand token having at least one Wiegand wire therein is carried out by supplying a first magnetic field to set a magnetization of a segment of Wiegand wire, supplying a second magnetic field to reset the magnetization of the segment of Wiegand wire, producing a respective output pulse in response to the setting and resetting of the magnetization of each segment of Wiegand wire, and detecting the Wiegand token from the produced output pulses.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 2A is a perspective view of a token passing between two read heads in accordance with the present invention, and FIGS. 2B and 2C schematically illustrate the respective paths of a token that is rejected and accepted, respectively, within a device embodying the read head of the present invention;

DETAILED DESCRIPTION OF CERTAIN PREFERRED EMBODIMENTS

Figure 1A:
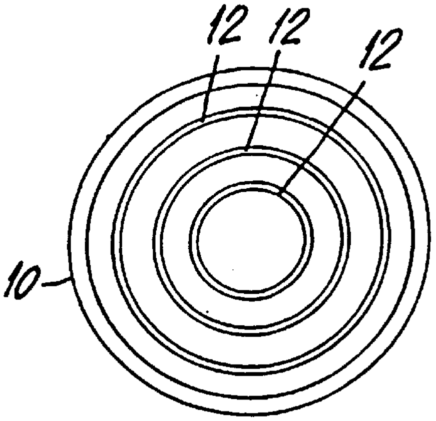
FIGS. 1A–1D and 1F–1G are different views of a novel token with Wiegand wire embedded therein used in conjunction with the read head of the present invention, and FIG. 1E schematically illustrates a Wiegand wire ring to be embedded in the token.

The read head of the present invention may be used in conjunction with a novel token with a Wiegand wire embedded therein, hereinafter, "Wiegand Token" or "Wiegand Wire Token." The novel Wiegand Token is the claimed subject matter of co-pending parent application Ser. No. 08/985,598, filed Dec. 5, 1997. A discussion of the novel Wiegand token is provided, followed by a discussion of the read head of the present invention.

Referring now to FIGS. 1A–1G, the novel Wiegand token essentially is a token body 10 with one or more grooves 12 therein, with a Wiegand wire 20 in the shape of a ring (FIG 1E) embedded within each groove 12. Token body 10 is flat, disk-shaped and made of any appropriate non-magnetic material. The token body 10, together with one or more Wiegand wires therein, is injected molded, or the like, to hold the Wiegand wires in place. A top surface 14 (shown in FIGS. 1C, 1D and 1F) of the Wiegand token may be applied with custom printing. The rear surface 16 of the Wiegand token likewise may be applied with custom printing.

The Wiegand token may be utilized in gambling or other coin-operated machines embodying the read head of the present invention. However, and unlike the known access systems mentioned above, the Wiegand token in combination with the read head of the present invention provides security as to authenticity, not by the particular arrangement of one and zero bits as in an access card, but by the number of Wiegand rings and the distances between those rings in the Wiegand token. Of course, the weight, size and shape of the Wiegand token itself may be taken into account. In FIGS. 1A–1D, a Wiegand token is shown as including three circular grooves in which three Wiegand wire rings are embedded. Given a token diameter of, for example, 1.5 inches and a distance between the Wiegand wire rings of, for example, 0.2 inches, a token having this exemplary diameter, number of rings and particular distance between rings can be said to have a particular, e.g., monetary, value. As another example, a 1.7 inch diameter Wiegand token having four wire rings therein, and a ring distance of 0.1 inches can be said to have a different, predetermined monetary value. Thus, the Wiegand token may have any desired diameter, any appropriate number of Wiegand wire rings embedded therein and any appropriate distance between wire rings. Of course, the distance between adjacent rings may be different from the distance between other adjacent rings within the same Wiegand token. Still further, the particular configuration of the Wiegand token (i.e., size, number of rings, etc.) may represent something other than a particular monetary value, such as a code. For example, a particular Wiegand token may represent an entry code.

The Wiegand token is for use in a coin operated machine or other device having the novel capability of being able to identify the insertion of the Wiegand token therein. Such novel machine may include a coin/token slot in which the Wiegand token is inserted, one or two novel Wiegand read heads in accordance with the present invention, a coin/token solenoid deflector and an appropriate processing system. FIG. 2A is a schematic illustration of a Wiegand token 10 passing between Wiegand read heads 30, 40 of the present invention, and FIGS. 2B and 2C schematically illustrate the path of an inserted coin/token, wherein the coin/token is rejected when it is determined to be an unacceptable or non-authentic coin/token (FIG. 2B), and the inserted coin/token is accepted when read heads 30, 40, in conjunction with the appropriate processing system (not shown), determine that the inserted coin/token is authentic (FIG. 2C). Hereinafter, all references to "token" are also intended to include coins and equivalents thereto.

When a token is inserted into the coin slot of a coin operated machine embodying the capability of detecting Wiegand tokens, the token passes by and between both read heads 30 and 40 shown in FIG. 2A. Two read heads 30, 40 of the present invention are preferably used so as to ensure detection of the insertion of a Wiegand token having wire rings 20 only on one side thereof (see FIG. 1F). Of course, one read head of the present invention by itself may be utilized.

Figure 3:
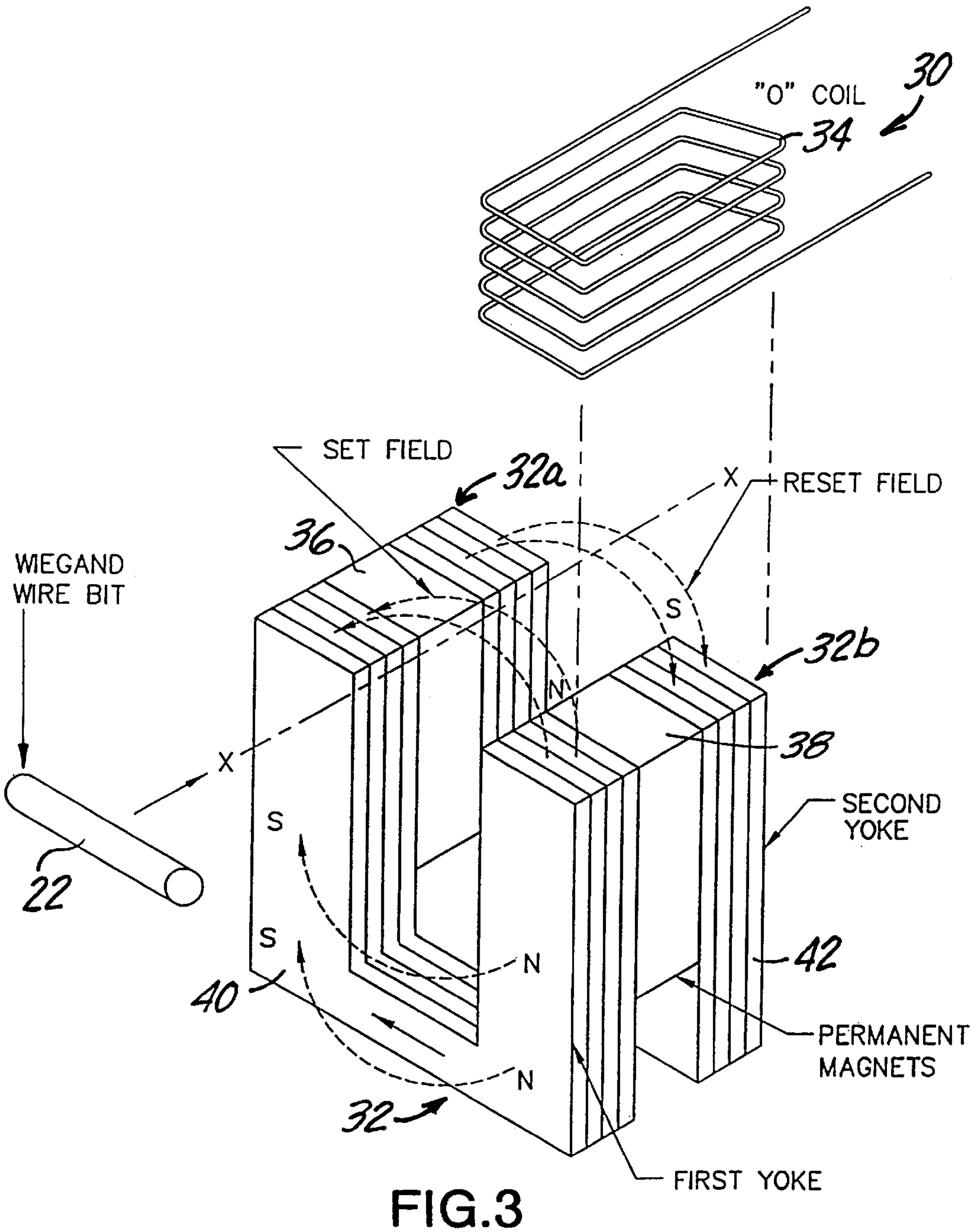
FIG. 3 is a perspective, partially exploded view of the read head of the present invention.

The read head 30 of the present invention will now be discussed in detail with reference to FIG. 3. The read head 40 shown in FIG. 2A may be identical to read head 30. As shown in FIG. 3, read head 30 includes a C-shaped core 32 having first and second legs 32*a*, 32*b*. On one of the legs, for example, leg 32*b*, pickup coil 34 is wound. First and second magnets 36, 38 are sandwiched between the legs of first and second ferro magnetic C-shaped yokes 40 and 42, respectively. As shown in FIG. 3, the north pole of magnet 38 is flush against the surface of yoke 40 and the south pole of this magnetic is flush against the surface of yoke 42. The direction of magnetization of the other magnet 36 is opposite from that of magnet 38 so that the south pole of magnet 36 is flush against yoke 40 and the north pole of magnet 36 is flush against yoke 42. The result of this magnetic orientation to the legs of the yokes is the field directions that are shown schematically in FIG. 3.

The C-shaped core 32 and coil 34 constitute read head 30, whereupon the passage of a wire segment 22 of one of the Wiegand wire rings 20, previously discussed, past the face of the read head in the direction and orientation, along the x-axis, shown causes the wire segments to undergo a switch in magnetic state, inducing an electric pulse in pick-up coil 34. In more particular detail, as wire segment 22 travels in the lateral direction shown, it first encounters a first magnetic field due to the leakage flux across the ends of the legs of yoke 40 resulting in the magnetization of wire segment 22 so that its shell and core are magnetized in the same direction. As wire segment 22 continues to pass across the face of read head 30 in the x-axis direction, it encounters another magnetic field adjacent to yoke 42, which field will be equal to but in the opposite direction from that of the field adjacent to yoke 40. The second field causes the wire segment 22 to reset. The result of the passage of wire segment 22 over the face of read head 30 is the induction of a significant output pulse in pick-up coil 34. Read head 30 is said to be a symmetric device since yokes 40 and 42 have equal widths. Yokes 40 and 42 thus have the same reluctance and cause an equal but opposite effect in the magnetization of the Wiegand wire. Therefore, and unlike prior art designs, both the setting and resetting of the Wiegand wire produces a substantial and significant flux change which in turn produces a useful output in pick-up coil 34. Also, the read head of the present invention produces an electric pulse of opposite polarity if the Wiegand wire passes by the face of the read head in the opposite direction, and thus read head 30 detects the direction of motion of the Wiegand wire.

As previously discussed, each Wiegand token has embedded therein at least one Wiegand wire ring. Then, by causing the inserted Wiegand token 10 to pass between the faces of read heads 30, 40 in the manner shown in FIG. 2A within an apparatus embodying the present invention, the Wiegand wire ring produces two so-called Wiegand pulses. If a Wiegand token having three Wiegand wire rings embedded therein is inserted, six Wiegand pulses are produced. Assuming the speed of the Wiegand token as it passes between read heads 30, 40 is known, the number of Wiegand wire rings embedded in Wiegand token 10 and the distances therebetween can be ascertained which, in turn, identifies the value of the inserted Wiegand token. Similarly, detection of the number of Wiegand pulses as well as the elapsed time between those pulses also identifies the value of the inserted Wiegand token. The weight, size and shape of the Wiegand token itself also could be utilized as previously mentioned. The particular design of the processing circuit used by the present invention and that is capable of converting a series of pulses, taken into account the time between the pulses, to a value is a matter of ordinary skill, and, therefore, further description thereof is omitted herein. Acceptance or rejection of an inserted token by solenoid deflector 50 (FIGS. 2B and 2C) is easily accomplished in response to the detected value, or the lack of a value, of the inserted token. Hence, tokens and coins not having any Wiegand wires therein will be rejected in a coin operated machine which accepts only Wiegand tokens or accepts only Wiegand tokens having particular values.

Figure 1B:
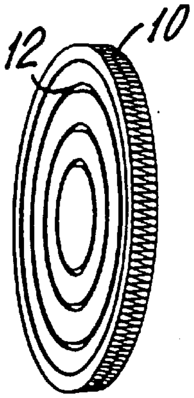
Figure 1E:
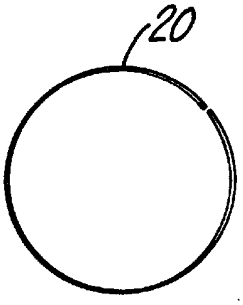
Figure 1C:
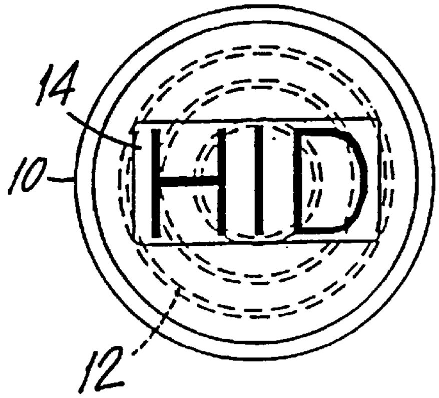
Figure 1D:
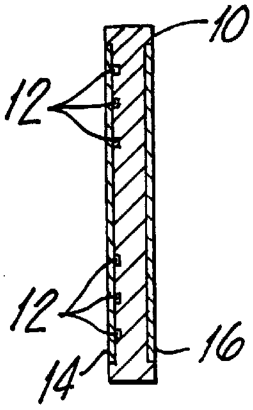

As previously discussed, the read head of the present invention is able to detect a Wiegand token that is, for example, circular in shape. The Wiegand wire(s) embedded within the Wiegand token may be open (as shown in FIG 1B), or closed, but open rings generally are preferred as they are simpler to construct and result in no loss in performance so long as the opening in each ring is relatively small. The ring or circular shape of the Wiegand wires that are embedded in the Wiegand token provides the advantageous feature that the Wiegand token can be inserted into a coin slot at any orientation. Such Wiegand wire rings also are relatively easy to construct from Wiegand wire that is produced, for example, in the manner disclosed in the U.S. Patents previously mentioned. Accordingly, a process of manufacturing Wiegand tokens is carried out by forming or purchasing a token that is made from any non-magnetic material, forming one or more circular grooves in one side of the token (see FIG. 1B), the grooves preferably being concentric, inserting or embedding an open or closed shaped Wiegand wire ring in each of the grooves, injecting a mold within the grooves to hold the Wiegand wire rings in place, or other equivalent, and optionally custom printing the face of the resultant token (e.g., print the value of the token thereon), or adhere an appropriate label to one or both faces of the token. Of course, other manufacturing methods may be used so long as the resultant Wiegand token has at least one Wiegand wire ring therein. In any case, the read head of the present invention is capable of detecting any number of types of Wiegand tokens, such as circular-shaped tokens, non circular-shaped tokens, tokens having one or more Wiegand wires embedded only on one face thereof, etc.

The use of one or two read heads of the present invention may detect tokens having Wiegand wires embedded near both faces thereof. The Wiegand wire rings embedded in the two faces may be arranged at the same location and, thus, only one read head 30 would be needed in a device to detect the insertion of a Wiegand token. Alternatively, the location of the Wiegand wire rings in the two faces of the Wiegand token may be different resulting in a different detected value of the token depending upon the orientation of the token upon insertion into the device.

Figure 4:
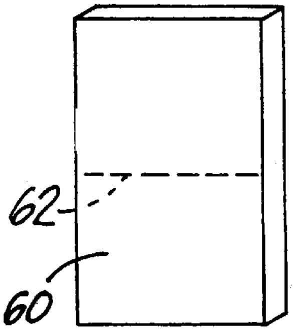
FIG. 4 is a perspective view, partially in phantom, of another token with a Wiegand wire embedded therein that may used in combination with the read head of the present invention.
Figure 1G:
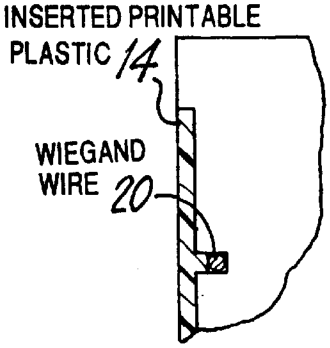
Figure 1F:
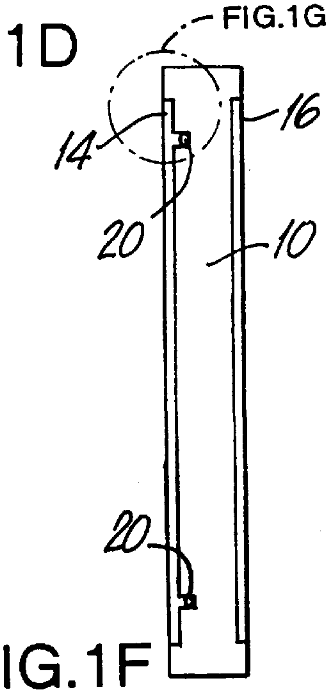

The read head of the present invention also may detect tokens and equivalents thereof that have non-circular shapes and/or that are not relatively flat. The read head can detect a Wiegand token with a square shape, a rectangular shape, etc., whereupon a square shaped, a rectangular shaped, a round shaped, etc., Wiegand wire is embedded therein. FIG. 4 is a perspective view of a Wiegand token 60 having a rectangular shape with a straight Wiegand wire 62 (shown in phantom) therein. The rectangular Wiegand token shown will be detected by the read head of the present invention provided the token is inserted in a particular orientation, such as by providing an insertion slot with an appropriate width and depth. These various shaped Wiegand tokens may be useful in various types of machines, such as gambling devices, entry devices, security devices, teaching devices, etc., and thus the read head of the present invention may be embodied in any number of devices.

Figure 5B:
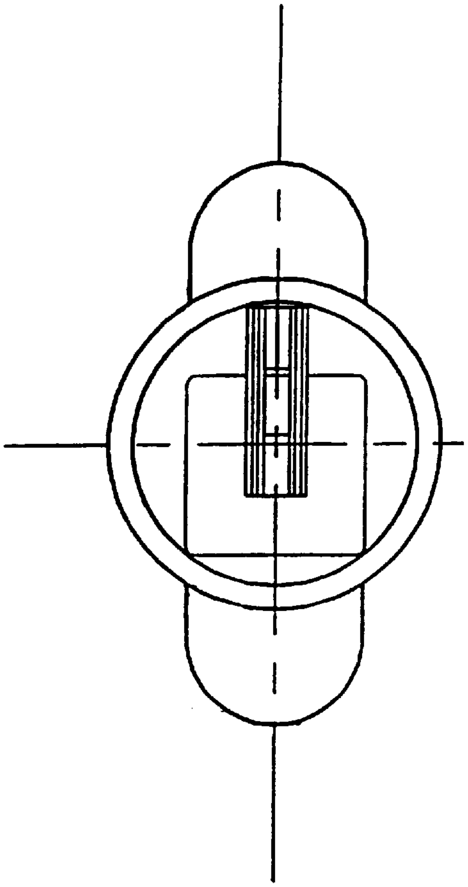
FIGS. 5A–5C schematically illustrate the read head of the present invention.
Figure 5C:
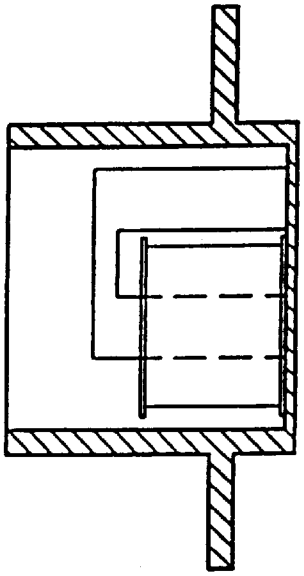
Figure 5A:
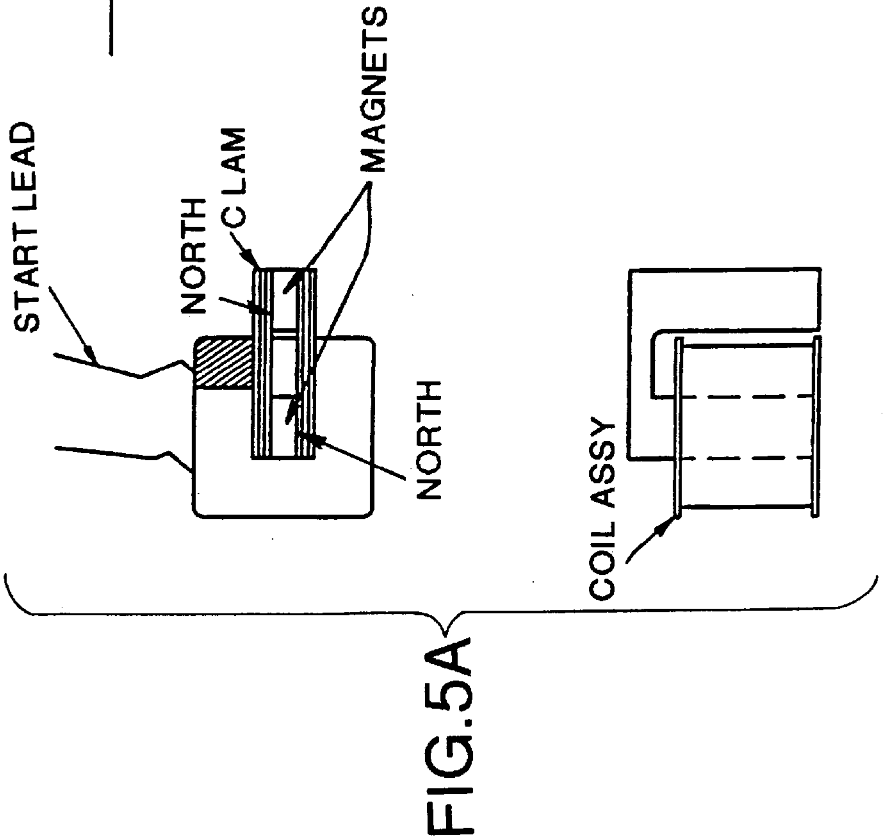

While the present invention has been particularly shown and described in conjunction with a preferred embodiment thereof, it will be readily appreciated by those of ordinary skill in the art that various changes may be made without departing from the spirit and scope of the invention. For example, FIGS. 5A–5C are exemplary schematic illustrations showing a particular design and dimensions of the read head of the present invention, but the present invention is not limited to this particular design and may have other designs that embody the present invention.

As another example, although the present discussion is directed to a read head that is capable of detecting a Wiegand token, the read head of the present invention may detect a Wiegand wire not embedded within a token. As a further example, the read head of the present invention also may be utilized to detect other types of magnetic devices.

Therefore, it is intended that the appended claims be interpreted as including the embodiments described herein, the alternatives mentioned above, and all equivalents thereto.

What is claimed is:

1. A read head for use with a ferro-magnetic wire having a core and a shell with independent magnetic properties wherein the read head responds to a field change generated from a switch in state of the wire to provide an output pulse, comprising:

first and second C-shaped ferro-magnetic yokes in lateral alignment with one another, each of said yokes having first and second legs;

first and second magnets sandwiched between the respective first and second legs of said yokes, said magnets and said yokes providing a magnetized core having first and second legs, a pickup coil wound on one of said first and second legs of said core, said first magnet having a first polarity adjacent to said first leg of said first yoke, said second magnet having said first polarity adjacent to said second leg of said second yoke, and reluctance of said first and second yokes are equal.

2. The read head of claim 1, wherein the field produced adjacent the ends of said first and second legs of said first yoke is substantially equal in amplitude and opposite in direction from the field produced adjacent the ends of said first and second legs of said second yoke.

3. The read head of claim 1 in combination with a token having a ferro-magnetic wire having a core and a shell with independent magnetic properties embedded therein, wherein the read head produces an output pulse when the token passes by said read head.

4. The combination of claim 3, wherein said wire embedded in said token is substantially circular in shape, and said read head responds separately to each magnetic field change generated from a switch in state of each of two wire segments of said wire in said token as the respective wire segment passes by said read head.

5. The read head of claim 1 in combination with a token having a plurality of ferro-magnetic wires embedded therein, each of said wires having a core and a shell with independent magnetic properties; wherein said read head responds separately to each magnetic field change generated from a switch in state of each of said wires in said token as the respective wire passes by said read head.

6. The combination of claim 5, wherein each of said wires embedded in said token is substantially circular in shape, and said read head responds separately to each magnetic field change generated from a switch in state of each of two wire segments of each of said wires in said token as the respective wire segment of the respective wire passes by said read head.

7. The combination of claim 6, wherein said plurality of wires in said token are concentrically aligned such that said read head produces a first pulse when a first segment of a first of said wires passes by said read head, followed by a second pulse when a first segment of a second of said wires passes by said read head, followed by a third pulse when a second segment of said first wire passes by said read head, followed by a fourth pulse when a second segment of said second wire passes by said read head.

8. Apparatus for detecting a token having embedded therein a ferro-magnetic wire having a core and a shell with independent magnetic properties, comprising:

a read head for responding to a field change generated from a switch in state of said wire embedded in said token as said token passes by said read head; and processing means for processing the output of said read head to identify whether or not said read head responded to a token having embedded therein a ferro-magnetic wire having a core and a shell with independent magnetic properties.

9. The apparatus of claim 8, wherein said read head produces an output pulse each time a segment of said wire embedded in said token passes by said read head; and said processing means detects the token from the output pulses produced by said read head.

10. The apparatus of claim 9, wherein said processing means detects the token from the time duration between occurrences of each of the output pulses produced by said read head.

11. The apparatus of claim 8, wherein said read head separately responds to a field change generated from a switch in state of each segment of each of a plurality of wires embedded in a token as the respective segment of the respective wire passes by said read head.

12. The apparatus of claim 11, wherein said read head produces a respective output pulse in response to each field change generated from a switch in state of each segment of each wire; and said processing means identifies the token by the number of output pulses produced by said read head and the time duration between occurrences of said output pulses.

13. The apparatus of claim 8, wherein said read head comprises:

first and second C-shaped ferro-magnetic yokes in lateral alignment with one another, each of said yokes having first and second legs;

first and second magnets sandwiched between the respective first and second legs of said yokes, said magnets and said yokes providing a magnetized core having first and second legs, a pickup coil wound on one of said first and second legs of said core, said first magnet having a first polarity adjacent to said first leg of said first yoke, said second magnet having said first polarity adjacent to said second leg of said second yoke, and reluctances of said first and second yokes are equal.

14. The apparatus of claim 13, wherein the field produced adjacent the ends of said first and second legs of said first yoke is substantially equal in amplitude and opposite in direction from the field produced adjacent the ends of said first and second legs of said second yoke.

15. A method of detecting a token having at least one ferro-magnetic wire having a core and a shell with independent magnetic properties therein, comprising the steps of:

supplying a first magnetic field to set a magnetization of a segment of said wire;

supplying a second magnetic field to reset the magnetization of the segment of said wire;

producing a respective output pulse in response to the setting and resetting of the magnetization of each segment of said wire; and detecting the token from the produced output pulses.

16. The method of claim 15, wherein said wire in said token is substantially circular in shape, and output pulses are produced in response to the setting and resetting of the magnetization of two different segments of the same circular wire.

17. The method of claim 15, wherein said detecting step is carried out by ascertaining a time duration between occurrences of said output pulses, and identifying the token from the ascertained time duration.

18. The method of claim 15, wherein a respective output pulse is produced in said producing step for each of a plurality of wires in said token, and said detecting step is carried out by identifying the number of produced output pulses, ascertaining time durations between occurrences of said output pulses, and identifying the token from the identified number of produced output pulses and the ascertained time durations.

* * * * *

UNITED STATES PATENT AND TRADEMARK OFFICE

CERTIFICATE OF CORRECTION

PATENT NO. : 5,898,241
DATED : April 27, 1999
INVENTOR(S) : Carl Gandarillas

It is certified that error appears in the above-identified patent and that said Letters Patent is hereby corrected as shown below:

Title page,
Item [12], "Ganderillas" should read -- Carl Gandarillas --.
Item [75], Inventor, should read -- Carl Gandarillas --.

Signed and Sealed this

Third Day of August, 2004

JON W. DUDAS
*Acting Director of the United States Patent and Trademark Office*